United States Patent [19]

Probert et al.

[11] 3,911,076
[45] Oct. 7, 1975

[54] PROCESS FOR PURIFYING MOLYBDENITE CONCENTRATES

[75] Inventors: Thomas I. Probert; Kenneth J. Richards; Craig N. Wright, all of Salt Lake City; Gerard E. Entrop, Sandy, all of Utah

[73] Assignee: Kennecott Copper Corporation, New York, N.Y.

[22] Filed: Dec. 28, 1973

[21] Appl. No.: 429,115

[52] U.S. Cl. ............... 423/53; 423/32; 423/33; 423/98; 423/109; 423/150; 75/103
[51] Int. Cl.² .......................................... C01G 39/00
[58] Field of Search .......... 423/32, 33, 53, 98, 150, 423/109; 75/103

[56] References Cited
UNITED STATES PATENTS

| | | | |
|---|---|---|---|
| 1,627,351 | 5/1927 | Stewart | 423/98 |
| 2,406,577 | 8/1946 | Alessandroni et al. | 423/150 X |
| 3,196,004 | 7/1965 | Kumda | 75/103 X |
| 3,620,670 | 11/1971 | Bratt et al. | 423/98 X |
| 3,647,423 | 3/1972 | Aconeno | 75/103 |
| 3,674,424 | 7/1972 | Stanley et al. | 423/150 X |
| 3,694,147 | 9/1972 | Drolinick et al. | 423/53 |
| 3,736,125 | 5/1973 | Wilden | 75/103 |

Primary Examiner—Herbert T. Carter
Attorney, Agent, or Firm—Mallinckrodt & Mallinckrodt

[57] ABSTRACT

A process for selectively removing oxidized metal impurities of one or more of the metals cobalt, zinc, nickel, and copper from a molybdenite concentrate comprises suspending the molybdenite concentrate in an aqueous solution containing at least about 10 grams per liter of ammonia and at least about 4 grams per liter of an ammonium salt and maintaining the suspension at a temperature of from about 25°C to about 90°C for a time sufficient for the aqueous solution to selectively leach at least a substantial portion of the impurities from the molybdenite concentrate. When the molybdenite concentrate contains nonoxidized metal impurities of such metals, e.g., copper sulfides, the impurities are converted to oxidized metal impurities in-situ in the suspension by contacting the suspension with an oxygen-containing gas, and the resulting oxidized metal impurities are leached from the molybdenum concentrate by the aqueous solution. The molybdenite concentrates can be further leached with an acidic brine solution or hydrochloric acid solution to remove lead or iron impurities respectively, therefrom.

9 Claims, 1 Drawing Figure

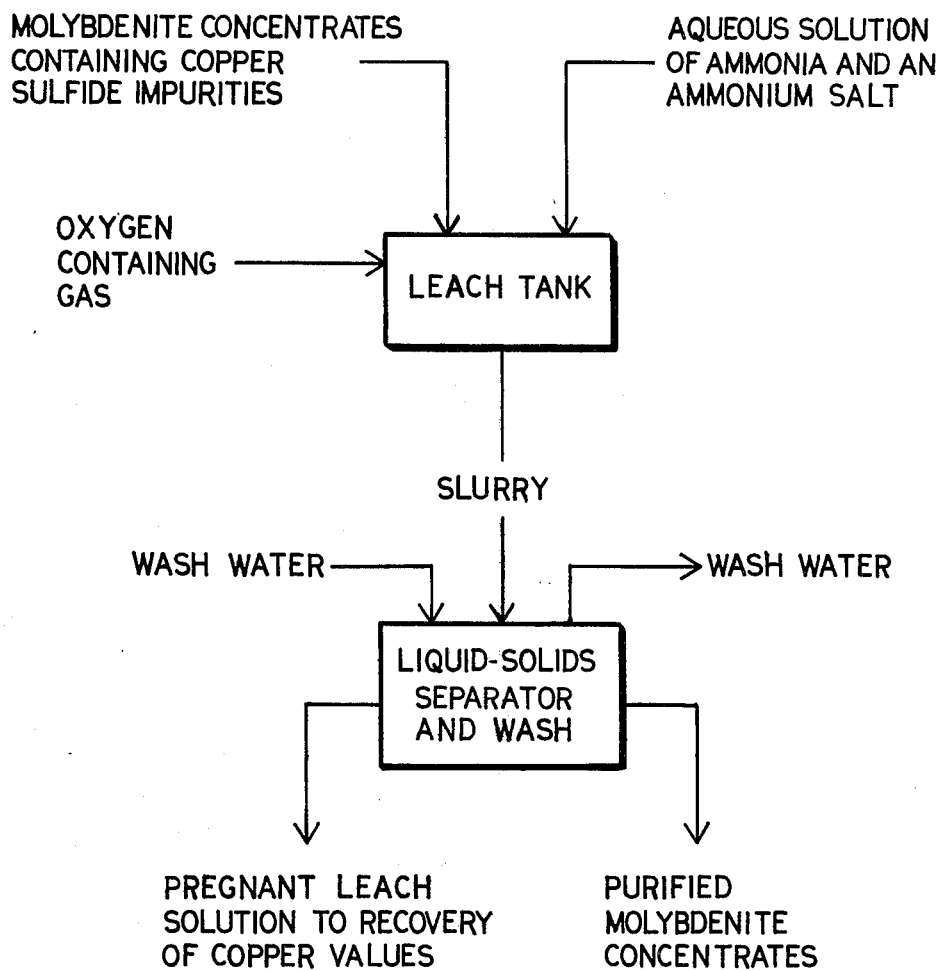

PROCESS FOR PURIFYING MOLYBDENITE CONCENTRATES

BACKGROUND OF THE INVENTION

1. Field

The invention pertains to processes for removing mineral impurities from molybdenite concentrates.

2. State of the Art

Copper and molybdenum minerals are frequently found together in ore bodies throughout the world, and are customarily removed from these ore bodies and separated from each other by differential froth flotation. The molybdenite concentrates so obtained contain small amounts of copper and other metal impurities, which must be removed if the molybdenite is to meet market requirements for a high purity product.

Molybdenum concentrates containing less than one percent (1%) copper and other metal impurities can be obtained by repeated differential flotation steps, but the yield of acceptable concentrates is usually poor, e.g., of the order of 60 to 80%. Several leach systems have been used to selectively remove impurities from molybdenum concentrates, including cyanide leaching, ferric chloride leaching, dry chlorination followed by leaching, and roasting followed by leaching (see, for example, U.S. Pat. Nos. 3,117,860; 3,196,004; 3,455,677; and 3,674,424). Although these processes are technically viable, they also have inherent problems which have hindered their commercial exploitation. The chloride systems are corrosive, requiring expensive materials of construction. In the roasting and leaching system, the combination of pyrometallurgical and hydrometallurgical operations involve large capital investment and high operating costs. The cyanide leach process is capable of removing only limited amounts of impurities from the molybdenite concentrates, and is, thus, applicable only to high grade concentrates. Further, the cyanide leach process involves high operating costs, and the leach filtrate therefrom contains sodium cyanide which presents a potential pollution problem.

Ammonia solutions and ammoniacal-ammonium carbonate solutions have been used with aeration in the dissolution of copper sulfide ores. Such processes require high operating pressures, and even then, have been found to be generally inefficient in dissolving the sulfide minerals especially chalcopyrite in such ores.

SUMMARY OF THE INVENTION

In accordance with the invention, oxidized metal impurities of one or more of the metals cobalt, zinc, nickel, and copper are selectively removed from a molybdenite concentrate by a process comprising suspending the molybdenite concentrate in an aqueous leach solution containing at least 4 grams per liter of ammonium salt and at least about 10 grams per liter of ammonia. The suspension is maintained at a temperature of from about 25°C to about 90°C for a time sufficient for the aqueous solution to selectively leach at least a substantial portion of the oxidized metal impurities from the molybdenite concentrate. The term "substantial portion" as used throughout the specification and claims is defined as "50% or greater". Nonoxidized metallic impurities, such as copper sulfides or native copper contained in the molybdenite concentrate, are converted to oxidized metallic impurities by contacting the suspension with an oxygen-containing gas. The resulting oxidized metallic impurities are then leached from the molybdenite concentrate. The purified molybdenite concentrate is recovered from the pregnant leach solution by conventional liquid-solid separation processes, such as by filtration.

It has been found that from 60 to 95 percent of copper sulfide impurities, including chalcopyrite, can be selectively leached from the molybdenite concentrate in 3 to 6 hours. The ability of the leach solution containing ammonia and an ammonium salt to leach chalcopyrite from the molybdenum concentrate is quite unexpected in view of the prior art experience, in which ammonia systems were found to be inefficient in dissolving chalcopyrite from copper sulfide ores. It is believed that galvanic action resulting from contact between molybdenite particles and chalcopyrite particles while submerged in the aqueous leach solution is responsible for the unexpected ability of the system to leach chalcopyrite from the molybdenum concentrate; however, the scope of the invention is not to be limited by such theory.

Preferably, the aqueous leach solution contains ammonia and an ammonium salt selected from the group consisting of ammonium sulfate, ammonium carbonate, ammonium nitrate, ammonium chloride, and ammonium acetate. When the leach solution is contacted with oxygen or air for in-situ oxidation of nonoxidized impurities, such contact is conveniently accomplished in a closed vessel with an oxygen partial pressure of from about 0.01 psig to about 100 psig.

Lead and iron impurities can be removed from the molybdenite concentrates, if desired, by an additional leach step which follows the treatment with the solution containing ammonia and an ammonium salt. The treatment with the solution of ammonia and ammonia salt leaches copper, cobalt, nickel, and zinc from the molybdenite concentrate according to the present invention as well as converts lead and iron impurities in the molybdenite concentrate into compounds which, although not soluble in the ammonia-ammonium salt solution, can be leached from the molybdenite concentrate by other leach solutions. An acidic brine solution will leach the converted lead impurities from the molybdenite concentrates while a dilute hydrochloric acid leaches converted iron impurities therefrom. In all cases, molybdenum extractions have been found to be less than 1 percent.

THE DRAWING

The best mode presently contemplated of carrying out the invention is illustrated in the accompanying drawing, in which the single FIGURE is a flowsheet showing the process applied to a molybdenite concentrate containing copper sulfide impurities.

DETAILED DESCRIPTION OF THE ILLUSTRATED EMBODIMENT

As illustrated in the accompanying flowsheet, a molybdenite concentrate containing copper sulfide mineral impurities is introduced into a leach tank together with an aqueous leach solution. The molybdenite concentrate is maintained in suspension in the aqueous leach solution at a temperature of about 25°C to about 90°C. The leach solution contains at least about 10 grams per liter of ammonia, preferably from about 25 grams of ammonia per liter to about 100 grams of ammonia per liter, and at least about 4 grams per liter of an ammonium salt, preferably from about 4 grams of ammonium salt per liter to about 100 grams of ammonium salt per liter. The ammonium salt is preferably selected from the group consisting of ammonium sulfate, ammonium carbonate, ammonium chloride, ammonium acetate, and ammonium nitrate. The term "ammonia" is used in its broadest sense to include $NH_3$ and $NH_4OH$ in aqueous solution and can be supplied to the leach solution as a concentrated solution of $NH_4OH$ or as anhydrous ammonia.

An oxygen-containing gas is maintained in contact with the suspension in the leach tank. Such contact can be achieved by leaching the molybdenite concentrates in a vessel which is open to the atmosphere so that oxygen containing air is in contact with the surface of the leach solution. Preferably, the leaching is done in a closed vessel and air, oxygen-enriched air, or oxygen is introduced into the vessel to maintain an oxygen partial pressure of from about 0.01 psig to about 100 psig in the closed vessel. The oxygen is absorbed by the leach solution and then reacts with the nonoxidized copper sulfide materials converting same to copper oxides, which in turn are leached from the molybdenite concentrate by the leach solution. In instances where the metallic impurities contained in the molybdenite concentrate are present in an oxidized form, such as a sulfate, oxide, or carbonate, the oxygen contact with the suspension can be minimized or even eliminated.

The overall chemical reaction occurring in the leach tank when chalcopyrite impurities are being leached from the molybdenite concentrate is given by the equation:

$$4CuFeS_2 + 17O_2 + 24NH_3 + 6H_2O \rightarrow 4Cu(NH_3)_4SO_4 + 2Fe_2O_3 \cdot H_2O + 4(NH_4)_2SO_4$$

However, it is known that the leaching reactions occur in stages involving intermediate oxidation states of sulfur, e.g., sulfamates, thiosulfates, tetrathionates, polythionates, etc.

A leach solution containing the ammonium salt and $NH_4OH$ or $NH_3$ can be introduced to the leach tank as shown in the drawing, or a dilute leach solution can be added to the leach tank with the ammonium salt and ammonia gas or a concentrated solution of ammonium hydroxide being introduced directly into the leach tank.

Following the leaching step, the slurry, containing the leached molybdenite concentrate, is forwarded to a liquid-solids separator, such as a filter, wherein the pregnant leach solution is separated from the molybdenite concentrate, and the latter is then washed with water or other wash solutions. The pregnant leach solution can be treated (not shown in the drawing) to recover ammonia and the copper and other metal impurities which were leached from the molybdenite concentrate. Copper can be recovered from the leach solution by adding a metal thereto which is more electropositive than copper to precipitate the copper from the solution, or the pregnant leach solution can be heated to first distill $NH_3$ therefrom and then to evaporate the solution whereupon copper oxides precipitate therefrom. The copper can also be recovered by precipitation with elemental sulfur and by electrodeposition from the solution, as well as other conventional processes. Alternatively, the pregnant leach solution from the filter can be discarded without creating a pollution problem, as the chemicals contained therein are relatively non-toxic and in addition are present therein in only small amounts.

The following examples will further illustrate the invention.

EXAMPLE I

A molybdenite concentrate produced by differential froth flotation of an ore containing molybdenite and copper sulfide was analyzed and found to contain 0.55% copper in the form of copper sulfides predominately as chalcopyrite. A sample of the molybdenite concentrate, having a particle size of 95% minus 100 mesh, was introduced into a closed vessel together with an aqueous leach solution containing 50 grams per liter of ammonia and 30 grams per liter of ammonium sulfate. The molybdenite concentrate was maintained in suspension in the leach solution at a temperature of 80°C for a period of 6 hours. An oxygen partial pressure of 2 psig was maintained by a total air pressure of 10 psig in the closed vessel during this 6-hour period.

The leached molybdenite concentrate was then separated from the aqueous leach solution by filtration and was found to contain 0.08% copper. Thus, approximately 85% of the copper contained in the initial molybdenite concentrate was extracted therefrom by the leach solution. Less than 0.5% of the molybdenite was extracted from the molybdenite concentrate during the 6-hour period.

EXAMPLE II

A portion of the unleached molybdenite concentrate of Example I was divided into 6 separate samples. Each sample was suspended in an aqueous leach solution in a closed vessel for 3 hours at the respective temperatures as shown in Table I. An oxygen partial pressure of 2 psig was maintained in the closed vessel during the treatment of each sample. The aqueous leach solutions used in treating the samples contained ammonia in the respective amounts shown in Table I along with 30 grams per liter of ammonium sulfate. The amount of copper extracted from each sample expressed as the percent of copper initially contained in the sample, is shown in Table I.

TABLE I

| Sample | Temperature°C | Ammonia Concentration g/l | Copper Extracted % |
|---|---|---|---|
| 1 | 27 | 50 | 40 |
| 2 | 60 | 50 | 59 |
| 3 | 80 | 50 | 75 |
| 4 | 80 | 25 | 55 |
| 5 | 80 | 50 | 75 |
| 6 | 80 | 75 | 80 |

As the data in Table I shows, the rate of copper extraction was dependent upon temperature. Increasing the temperature from 27°C to 80°C almost doubled the amount of copper extracted in the 3-hour treatment. The data also shows that the rate of copper extraction was dependent on the concentration of ammonia in the leach solution. Increasing the ammonia concentration from 25 grams per liter to 50 grams per liter increased the degree of extraction of copper impurities from 55% to 75%. An increase of ammonia concentration to 75 grams per liter resulted in a further slight increase in copper extraction.

EXAMPLE III

A molybdenite concentrate similar to that of Example I was divided into two portions. The first portion was divided into samples which were in turn treated in a closed vessel according to the procedure of Example I with the exception that the partial pressure of oxygen in the leach vessel was varied from sample to sample. The second portion was treated according to the procedure of Example I with the exception that the leach vessel was open to the atmosphere at its top.

The test results showed that oxygen overpressure is not critical when treating molybdenite concentrates containing nonoxidized metallic impurities such as copper sulfides. All that is required is that oxygen be in contact with the leach solution. The copper extracted in those samples treated in the open vessel was approximately 60% of the copper contained in the untreated molybdenite concentrate. In the closed vessel, ammonia losses were restricted and the extraction of copper increased to the values reported in Examples I and II. An increase in oxygen partial pressure of from 0.01 psig to 8 psig for the samples contained in the closed vessel did not markedly increase the extraction of copper from the molybdenite concentrates.

EXAMPLE IV

A molybdenite concentrate similar to that of Example I was divided into separate samples. The samples were treated according to the procedure of Example I with the exception that the leach solution used to treat the separate samples had varying amounts of ammonium salts contained therein respectively. The minimum effective amount of ammonium salt in the leach solution was found to be about 4 grams per liter. The upper limit of ammonium salt concentration was not critical, and in fact, was limited only by the solubility of the particular salts being used.

EXAMPLE V

A molybdenite concentrate which contained zinc sulfide impurities was treated in a closed vessel according to the procedure of Example I. Approximately 75% of the zinc impurities were selectively removed from the molybdenite concentrate by the aqueous leach soslution in the 6-hour leach period.

EXAMPLE VI

A sample of a molybdenite concentrate containing copper sulfide and lead sulfide impurities was treated in a closed vessel according to the procedure of Example I to remove the copper impurities therefrom. The lead impurities were oxidized to lead sulfate impurities during the leach with the aqueous leach solution containing ammonia and ammonium sulfate. The molybdenite concentrate containing the lead sulfate impurities was then contacted with an acidified brine solution (pH of 1) for 10 minutes. 30% of the lead impurities were selectively removed from the concentrate sample during the 10 minute period.

EXAMPLE VII

A sample of a molybdenite concentrate containing copper sulfide and iron sulfide impurities was treated in a closed vessel according to the procedure of Example I to remove the copper impurities therefrom. The iron impurities were oxidized to iron oxide impurities during the leach with the aqueous leach solution containing ammonia and ammonium sulfate. The molybdenite concentrate containing the iron oxide impurities was then contacted with a 15% hydrochloric acid solution for 1 minute. The hydrochloric acid solution leached sufficient iron oxide impurities from the molybdenite concentrate to upgrade the concentrate from 79% molybdenite to 84% molybdenite.

In all the above examples, it was found advantageous to agitate the aqueous leach solution containing the molybdenite concentrate solids so that the solids were kept in suspension in the leach solution, i.e., no accumulation of solids on the bottom of the leach tank.

Whereas this invention is illustrated and described herein with respect to certain preferred procedures thereof, it is to be understood that many variations are possible without departing from the inventive concepts particularly pointed out in the claims.

What we claim is:

1. A process for selectively removing oxidized metal impurities of one or more of the metals cobalt, zinc, nickel and copper from a molybdenum concentrate containing same, comprising suspending such a molybdenite concentrate in an aqueous solution containing at least about 4 grams per liter of an ammonium salt and at least about 10 grams per liter of ammonia; maintaining the suspension at a temperature of from about 25°C to about 90°C for a time sufficient for said solution to selectively leach at least a substantial portion of said impurities from the molybdenite concentrate; and separating aqueous solution pregnant with said impurities from the purified molybdenite concentrate.

2. A process as claimed in claim 1 wherein the molybdenite concentrate suspended in the aqueous solution contains nonoxidized metal impurities which are converted to said oxidized metal impurities in-situ in said suspension by contacting said suspension with an oxygen containing gas.

3. A process as claimed in claim 2 wherein the nonoxidized metal impurities in said molybdenite concentrate comprise copper sulfides.

4. A process as claimed in claim 2 wherein the suspension is maintained in a closed vessel with an oxygen partial pressure of from about 0.01 psig to about 100 psig.

5. A process as claimed in claim 1 wherein the aqueous solution contains from about 10 grams of ammonia per liter to about 100 grams of ammonia per liter.

6. A process as claimed in claim 1 wherein the aqueous solution contains from about 4 grams of ammonium salt per liter to about 100 grams of ammonium salt per liter.

7. A process as claimed in claim 6 wherein the ammonium salt is selected from the group consisting of ammonium sulfate, ammonium carbonate, ammonium chloride, ammonium acetate, and ammonium nitrate.

8. A process as claimed in claim 2 wherein said molybdenite concentrate also contains lead impurities and said purified molybdenite concentrate is further leached with an acidified brine solution to remove lead impurities therefrom.

9. A process as claimed in claim 2 wherein said molybdenite concentrate also contains iron impurities and said purified molybdenite concentrate is further leached with a hydrochloric acid solution to remove iron impurities therefrom.

* * * * *